United States Patent [19]

Bland et al.

[11] Patent Number: 5,137,753
[45] Date of Patent: Aug. 11, 1992

[54] PELLETIZING ASH

[76] Inventors: Alan E. Bland, 259 Pepper Dr., Lexington, Ky. 40511; Richard K. Cox, 1170 Constitution Dr., Brunswick, Ohio 44212; E. Ray Lichty, 10 Hickory Meadow Rd., Cockeysville, Md. 21030; Allen R. Rowen, 1762 King James Pkwy., Westlake, Ohio 44145; Richard A. Schumann, 101 Burning Pine Ct., Ponte Verde Beach, Fla. 32082

[21] Appl. No.: 603,899
[22] Filed: Oct. 25, 1990
[51] Int. Cl.$^5$ .................... B05D 7/24; B29C 67/24; B32B 9/04
[52] U.S. Cl. .................... 427/180; 427/215; 427/384; 427/397.7; 106/405; 106/705; 264/117; 264/DIG. 49; 428/403
[58] Field of Search ............ 427/180, 215, 384, 397.7; 106/405, 705, 707, 708, 710, DIG. 1; 264/117, DIG. 49; 23/313 P, 313 R; 110/342, 344; 405/129; 428/403

[56] References Cited

U.S. PATENT DOCUMENTS

| | | |
|---|---|---|
| 833,005 | 10/1906 | Schulte-Steinberg ............... 75/313 |
| 859,411 | 7/1907 | Schumacher ....................... 75/768 |
| 3,490,895 | 1/1970 | Svensson ............................ 264/15 |
| 3,852,084 | 12/1974 | Webster et al. .................... 106/710 |
| 4,313,762 | 2/1982 | Pound ................................ 106/706 |
| 4,344,796 | 8/1982 | Minnick ............................ 106/705 |
| 4,354,876 | 10/1982 | Webster ............................. 106/611 |
| 4,394,176 | 7/1983 | Loggers ............................. 106/797 |
| 4,397,742 | 8/1983 | Minnick ............................ 210/716 |
| 4,397,801 | 8/1983 | Minnick ............................ 106/708 |
| 4,419,312 | 12/1983 | Loggers et al. ..................... 264/82 |
| 4,472,198 | 9/1984 | Nowicki et al. ................... 106/706 |
| 4,490,178 | 12/1984 | Loggers et al. .................... 106/710 |
| 4,514,307 | 4/1985 | Chestnut et al. ................... 210/751 |
| 4,618,376 | 10/1986 | Saternus et al. ................... 106/705 |
| 4,629,509 | 12/1986 | O'Hara et al. .................... 106/697 |
| 4,731,120 | 3/1988 | Tutti ................................. 106/705 |
| 4,744,829 | 5/1988 | Eirich et al. ....................... 106/705 |
| 4,764,216 | 8/1988 | Hooykaas .......................... 106/710 |
| 4,770,709 | 9/1988 | Loggers ............................. 106/710 |
| 4,770,831 | 9/1988 | Walker ............................... 264/117 |
| 4,780,144 | 10/1988 | Loggers ............................. 106/710 |
| 4,877,453 | 10/1989 | Loggers ............................. 106/710 |
| 4,880,582 | 11/1989 | Spanjer et al. ..................... 264/82 |
| 4,940,611 | 7/1990 | Brunet et al. ..................... 427/220 |
| 4,941,772 | 7/1990 | Roesky et al. .................... 405/128 |
| 5,002,611 | 4/1991 | Rademaker ....................... 106/705 |
| 5,008,055 | 4/1991 | Holley ............................... 264/117 |

FOREIGN PATENT DOCUMENTS

| | | | |
|---|---|---|---|
| 58-99146 | 6/1983 | Japan ................................ 427/215 |
| 62-79890 | 4/1987 | Japan ................................ 106/707 |

OTHER PUBLICATIONS

Contract Report: Production of Concrete Using Fluidized Bed Combustion Waste and Power Plant Fly Ash, Sep., 1986, Rose, Bland, & Jones.
Agglomeration of Steel Plant Waste for Recycling, Sep., 1985 Holley.

Primary Examiner—Shrive Beck
Assistant Examiner—Terry J. Owens
Attorney, Agent, or Firm—Weston, Hurd, Fallon, Paisley & Howley

[57] ABSTRACT

Ash from a fluidized bed combustor in which limestone particles are suspended in the presence of carbonaceous fuel being burned is pelletized. Lime-containing bed ash ("FBCR") is produced in the combustor, and fly ash ("FBC fly ash") is generated as a by-product of the combustion process. FBCR and FBC fly ash generated during the combustion process are obtained. Water is added to the FBCR so as to convert a substantial portion of the lime to hydrated lime. Water is added to the FBC fly ash and pellets are formed from the FBC fly ash. The FBC fly ash pellets are coated with the hydrated FBCR. The coated FBC fly ash pellets are cured in a curing silo for a minimum of 6–10 hours, preferably by nesting them in a bed of hydrated FBCR. The cured pellets then are separated from the bed of hydrated FBCR. New pellets are formed by mixing the separated, hydrated FBCR with FBC fly ash and water. The pellets formed with the separated, hydrated FBCR contain about 0–80% by weight of FBCR and about 100–20% by weight of FBC fly ash. Agglomeration of the pellets in the curing silo is prevented by coating the pellets with hydrated FBCR. Agglomeration also can be prevented by spraying newly formed pellets with certain chemicals, by drying their surfaces, or by coating the pellets with inert materials other than hydrated FBCR.

59 Claims, 6 Drawing Sheets

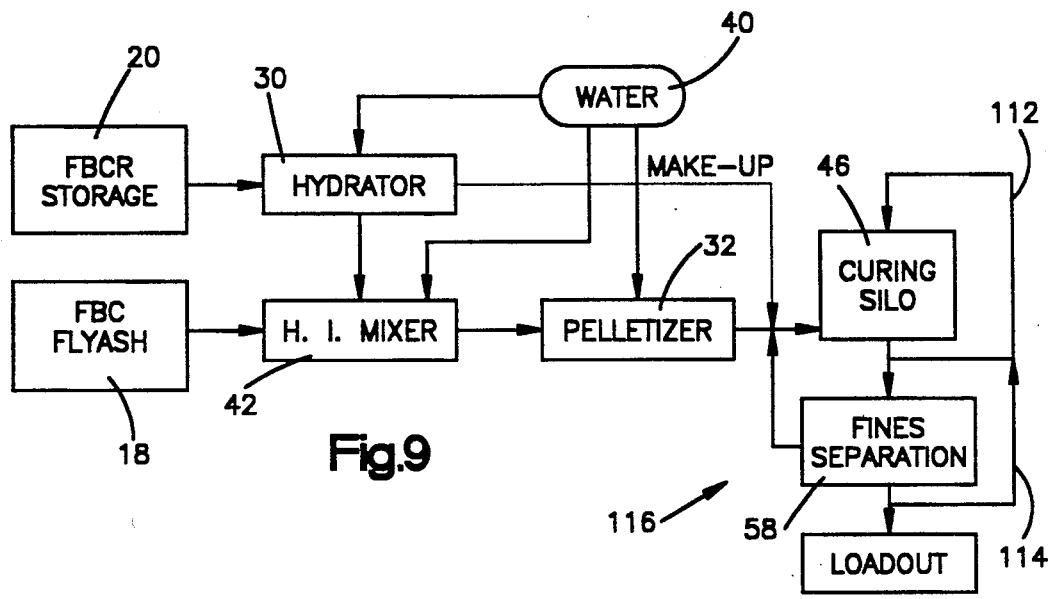
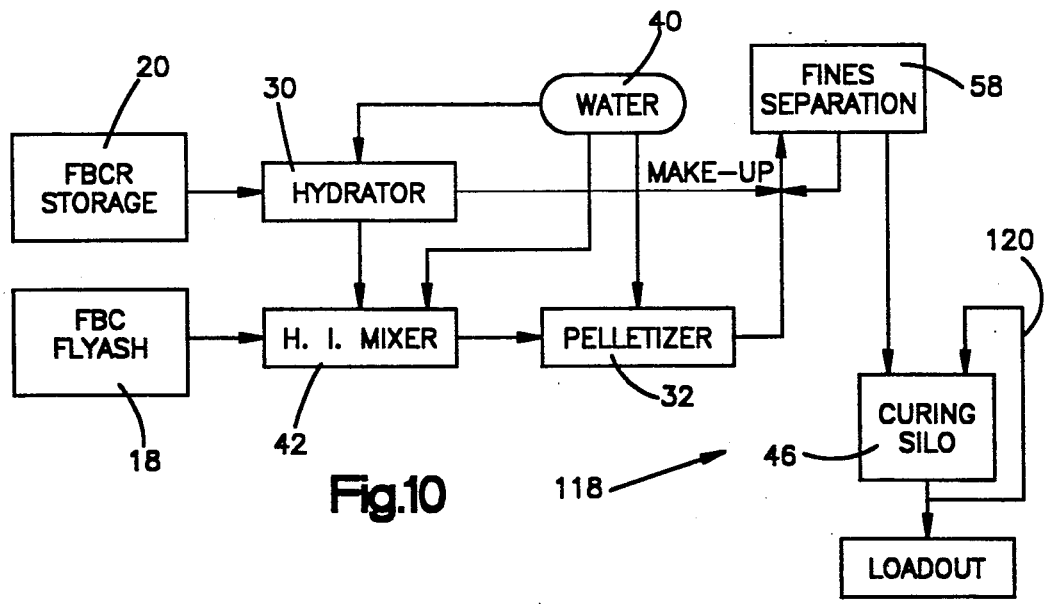

PELLETIZING ASH

BACKGROUND OF THE INVENTION

1. Field of the Invention

The invention relates to processes for pelletizing ash resulting from the combustion of carbonaceous fuels such as coal and, more particularly, to preventing agglomeration and other material-handling flow problems that can occur during pellet curing.

2. Description of the Prior Art

The combustion of carbonaceous fuels for the production of electricity and/or process steam by the utility and industrial sectors is a major generator of ash. Apprehension about the pollution from the smoke stack industries and utilities has led to the implementation of flue gas cleaning technologies for sulfur dioxide ($SO_2$) emissions, as well as particulate emissions. Technologies for the control of sulfur emissions for combustion systems have been developed and are being implemented. These technologies generically have been termed clean coal technologies ("CCT"). Examples of these CCT's are fluidized bed combustion ("FBC"), spray dryer flue gas desulfurization ("FGD"), limestone furnace injection ("LFI") and calcium-based sorbent duct injection ("CDI"). Each of these CCT's introduces lime (CaO) or limestone ($CaCo_3$) to neutralize the $SO_2$ emitted during combustion by reactions which form sulfate/sulfite salts.

Perhaps the most advanced of the CCT's is FBC. FBC involves the combustion of a carbonaceous fuel in a fluidized bed containing a sorbent, such as limestone, which is calcined to form lime. The calcined lime reacts with $SO_2$ and $O_2$ typically to form calcium sulfate. The control of sulfur emissions is accomplished within the combustion chamber, which eliminates the need for adding a wet flue gas desulfurization ("WFGD") process.

Dry flue gas desulfurization ("DFGD"), also known as the spray dryer process, also is possible for $SO_2$ control. The spray dryer process is a flue gas cleaning process whereby a fine mist of lime or lime slurry contacts the flue gas in a reaction chamber, and produces a dry ash. Sulfur dioxide reacts with the mist and forms calcium sulfate/sulfite. Limestone/lime furnace injection, or LFI, involves the direct injection of pulverized calcium-based sorbent, such as hydrated lime or limestone, into a combustion zone above the burners. Once again, the $SO_2$ in the flue gas reacts to form calcium sulfates/sulfites. Finally, the calcium duct injection process, or CDI, introduces powered sorbent lime or limestone into the flue gas ductwork downstream of the combustion zone, but upstream of a particulate collection system.

All of these coal-fired CCT's generate several high-volume residues. These include ash from the combustion of coal, as well as reaction products from sulfur oxide $(SO)_2$ control processes, including unreacted calcined sorbent. Ash is categorized as bottom ash, collected from the furnace, and fly ash, which consists of lighter, finer particles removed by mechanical collectors, electrostatic precipitators ("ESP"), and/or fabric filters downstream of the combustor. The neutralization of $SO_2$ in the flue gas with calcium-based sorbent results in unreacted lime/limestone, thereby making CCT residue unique.

A particular problem arises with respect to FBC ashes. In part, this is because FBC ashes are distinctly different from ashes generated by other CCT technologies, as well as conventional pulverized fuel ash ("PFA") as produced by conventional pulverized coal combustion processes. FBC ashes are not glassy, like PFA ashes, due to a lower temperature of combustion (1500° F., compared to 2500°14 3000° F.). Furthermore, FBC ashes appear to have a high amount of soluble components and generate high pH wastewaters, unlike those from pulverized fuel ashes. Another unique property of FBC ash is the exothermic character of the ash (the ability to generate heat upon the addition of water) and the swelling of the ashes upon contact with water. These unique properties of FBC ash require specialized processing and disposal techniques.

Processes typically used for the handling and disposal of PFA are inadequate for FBC ash. Typically, PFA is conditioned with water and is sluiced to a pond for disposal FBC ashes have been conditioned with water and have been trucked to a disposal site for compaction. Unfortunately, the addition of water to FBC ash generates considerable heat and steam, both of which adversely affect operations and compaction. In addition, the ashes cannot be transported great distances due to their tendency to harden in the trucks.

Alternatively, FBC ash could be handled in dry form. However, the dry-handling of ash requires the use of pneumatic transfer and pressurized transport equipment similar to that used in the cement industry. The dry-handling of ash is expensive, especially if it is desired to backhaul the ash to the coal mine which supplied the coal. Such a haul often is lengthy and is not compatible with the barge and rail service which supplied the coal, thereby limiting the economic advantages of backhaul.

Another process often employed for the handling of ash is pelletization. Pelletization is not new, and commercial processes exist for the pelletization of conventional PFA using cement or lime as a binder and as a chemical reactant. The gravel-like material produced by pelletization permits the use of conventional backhaul equipment, thereby enhancing the economics of ash disposal. In addition, the pelletized material is less prone to leaching of metals and other components of the ash due to the impermeable nature of the pellets. Another advantage of pelletization is that the pelletized form and the hardness of the pellets make the pellets amenable to use as an aggregate in various construction applications, such as road bases, concretes, and masonry units and shapes.

While the successful pelletization of FBC ashes is a desirable objective, acceptable commercial processes for the pelletization of FBC ashes have not been available. One approach that appears to show promise is disclosed in U.S. Pat. No. 4,344,796, issued Aug. 17, 1982 to L. John Minnick. In the '796 patent, residue from a fluidized bed combustor ("FBCR") is recovered from the combustion process and is mixed with water so as to convert all of the quicklime particles in the FBCR to calcium hydroxide. The '796 patent discloses that about 20-30% by weight of water is needed to hydrate substantially all of the quicklime particles. The water and FBCR are mixed for about 15 minutes so that hydration will be complete. Thereafter, the water-FBCR mixture is cooled to room temperature. The converted FBCR then is mixed with PFA or other pozzolanic material. The '796 patent discloses that the resultant mixture contains about 90-10% FBCR and 10-90% PFA. Additional water may be added to bring the moisture content of the mixture to within the range of about 9-20% by weight.

After the aforementioned mixture has been prepared, it is formed into desired shapes and then is cured over a period of about 7-28 days at a temperature of about 100° F. The shaped and cured product is stated to be environmentally stable, that is, it can be stockpiled for long periods of time without excessive leaching or surface runoff. The shaped and cured product also can be used as a structural material (such as masonry blocks) or it may be crushed to form a high-strength aggregate that is useful in load-bearing applications.

Despite the promising approach taken by the '796 patent, certain concerns have not been addressed adequately. The most important concern relates to the type of fly ash that can be pelletized successfully. The '796 patent indicates that pelletizing is successful only with a mixture of FBCR, bituminous fly ash, and sodium silicate as a binder. Pellets made from FBCR and FBC fly ash, even with the addition of sodium silicate binder, could not be pelletized. The result of the failure to incorporate FBC fly ash into the pellets means that a separate source of pozzolanic material such as PFA is needed. Accordingly, the '796 patent does not disclose an integrated technique for disposing of all of the ash products (both FBCR and FBC fly ash) produced by a fluidized bed combustor. The inability to successfully pelletize and dispose of all of the ash products produced by a given fluidized bed combustor is a serious limitation on the technique disclosed by the '796 patent.

Another problem with the technique disclosed in the '796 patent is the tendency of the pellets to be sticky so as to agglomerate into a solid mass during curing. In addition, pelletization of FBCR creates large amounts of heat and steam, which, although good for the curing process, is a concern from a safety and process control perspective. It also has been found that the pellets containing unhydrated FBCR can become weak and lose strength during curing, resulting in the generation of large amounts of fines and dust. An important requirement of the pelletizing process is the intimate mixing of the ash and the water (typically by means of a high-intensity pin mixer). However, FBCR contains particles which are large and which can create excessive wear of the mixing equipment.

Another pelletizing technique is disclosed in U.S. Pat. No. 4,880,582, issued Nov. 14, 1989 to J. J. Spanjer et al. In the '582 patent, a mixture of fly ash, lime, water, and "other components" are provided. The "other components" are stated to be residues of combustion processes, such as bottom ash, ash from fluidized bed boilers, and other types of ash. The mixture is pelletized and is directed into a hardening reactor (curing silo) where the pellets are embedded in a fine-grained material having a water absorption of at least 8%. A preferred embedding material is fly ash produced by the combustion process. After the pellets have been placed in the curing silo with the embedding material, steam is added to maintain a temperature of between 85° F. and 212° F. Curing is carried out for about 16-18 hours. After curing, the pellets are screened. Excess embedding material is returned to the mixer for use as a starting material in the formation of additional pellets.

The '582 patent, like the '796 patent, fails to address certain concerns. By mixing the "other components" directly into the pelletizing mixture, it is believed that excessive heat and steam will be generated in the mixing equipment, and that the mixing equipment will be subjected to excessive wear. The process disclosed by the '582 patent also requires the use of a binder in the form of lime that is provided from a separate source. The process disclosed by the '582 patent additionally requires the use of steam in the curing silos to effect adequate curing. Furthermore, while the curing time is considerably less than that disclosed in the '796 patent, it still is longer than desired.

Desirably, a process would be available for the pelletizing of all of the FBCR and FBC fly ash produced by a given FBC without the need to (1) use a binder from an external source, (2) supply PFA or other pozzolanic material from a separate combustion source, or (3) supply steam or other curative agent. The processing technique preferably would avoid the agglomeration of the pellets during curing. Such a process preferably would minimize breakage of the pellets during curing and swelling of the pellets in the curing area. Also, such a process desirably would cure the pellets in a very short period of time. An additional feature desired of any pelletizing process would be the minimization of wear of the high-intensity mixing equipment necessary for intimate mixing of the ash with water for pelletization.

SUMMARY OF THE INVENTION

In response to the foregoing concerns, the present invention provides a new and improved processing technique for pelletization of 100% of the ash produced from the combustion of carbonaceous fuels such as coal. While the present invention is adapted particularly for use with ash produced by a fluidized bed combustor, and while the majority of the description herein will be with respect to ash from such a combustor, it is to be understood that the techniques of the present invention are applicable equally to ash produced from other types of CCT combustors and incinerators.

In the preferred pelletizing technique according to the present invention, FBCR is separated from FBC fly ash and subsequently is treated with a prehydration step. The prehydration of the FBCR is accomplished via a hydrator in which sufficient water is added to the FBCR so that a controlled amount of the lime (CaO or quicklime) in the FBCR is converted to portlandite ($Ca(OH)_2$ or hydrated lime). Water, typically 8-16% of the weight of the FBCR, is added to achieve 50-95% hydration of the lime. About 520 minutes of gentle mechanical agitation of the FBCR-water mixture assists in the hydration and ensures adequate water dispersion, steam generation, mixing and hydration of the lime. Testing has shown that hydrating the FBCR prior to its pelletization can reduce heat and steam generation during pelletization, reduce swelling in the curing area, and prevent the deterioration of the pellets due to swelling and steam release. Proper control of the hydration step is important in order to provide a desired amount of unhydrated lime in the FBCR; a certain amount of unhydrated lime is necessary to control the heat and steam conditions that occur during curing.

During the initial stages of the pelletizing process, the FBC fly ash is pelletized apart from the FBCR. The FBC fly ash to be pelletized is mixed with water in a high-intensity mixer, such as a pin mixer, to ensure adequate dispersal of the water and effective separation and coating of the individual ash particles with water. The ash from the high-intensity mixer is discharged to pelletizing equipment, such as a pan or disc pelletizer, where the inclined rotating action of the pan facilitates the agglomeration or pelletization of the ash into pellets which will discharge from the pan upon reaching a certain size. Additional water is usually sprayed onto the pellets being formed to facilitate pellet growth.

The pelletized ash is discharged from the pelletizing equipment and is conveyed to a curing area. Typically, the curing area is a silo or other structure designed to house the newly formed (green) pellets for a specified period until the pellets attain crush strengths in the range of 50 pounds. Testing has shown that the curing time is a function of the ash characteristics, which in turn are a function of the coal characteristics and combustor operating conditions. In addition, testing has shown that the curing time is a function of the temperature, as well as the moisture availability, of the pellets. Curing at 180° F. will reduce the curing time by a factor of 6-10 times. For low lime/calcium sulfate ash as would be derived from a low-sulfur coal, about 8-10 hours is sufficient to produce pellets with crush strengths greater than 100 pounds. However, for medium lime/calcium sulfate-containing ashes as would be produced from a medium-sulfur coal, curing times of 6 hours are capable of producing pellets with greater than 100 pounds crush strength. In the disclosed process, no additional external heat or steam is supplied to the curing step, thereby reducing costs. It has been found that sufficient heat and steam can be generated by the ashes themselves; however, heat or steam could be added if certain ashes do not generate sufficient amounts of heat and steam themselves.

The green pellets are treated to prevent the pellets from agglomerating and hardening into a solid mass in the curing area during the curing period. Several techniques have been shown to be successful in preventing agglomeration. All of these techniques are designed to affect the surface of the pellets so as to halt the binding reactions between the pellets. These techniques include the use of chemicals which will react with the calcium in the ash and prevent the continued binding or hardening reaction. A second technique involves the use of heat/and or air to dry the pellet surfaces and thereby prevent the mobility of reactants between the pellets. With air drying, the pellet surfaces are dried prior to discharging the pellets into the curing area. Typically, 10 minutes or longer is needed for the drying to be successful. A potential limitation of the pellet-drying technique is that if the pellets are broken after treatment but prior to final placement in the curing silo, then fresh untreated and potentially reactive and agglomerating surfaces will be produced. A third technique involves moving the pellets during curing to prevent the bonding of the pellets or to break any pellet-to-pellet bonds that have been formed. Testing has shown that this method is successful if movement of all of the pellets relative to their neighboring pellets is provided. The final technique for preventing agglomeration is to coat the pellets with a non-reactive (inert) granular or powdery material. Testing has shown that about 10% of coating material by weight of pellet is sufficient to effectively coat the pellet surfaces and prevent agglomeration. The minimum amount of coating material will vary as a function of the size of the pellets (surface area to coat) and the particle size of the coating material. Although each of the foregoing techniques is successful in preventing agglomeration and is included in the present disclosure, the use of an inert coating material is preferred for the particular case of FBC ashes.

Any non-reactive material such as sand or limestone can be used as a coating material. However, a unique coating material in the form of hydrated FBCR, or so-called recycle ash, has been discovered. Recycle ash is the excess coating material and/or cured pellet fines which are removed from the coated pellets, usually after curing. Testing has shown that non-hydrated FBCR as a coating material will create excess heat and steam and will result in a loss of pellet strength as compared to the use of hydrated FBCR. In fact, the amount of hydration of the FBCR can be used to control the heat generation and steam availability to the pellets during curing.

The coated pellets are delivered to the curing area where they cure for a specified period of time, after which they are withdrawn, either automatically or manually by equipment such as a front end loader, and are delivered to a fines separation device. The purpose of the fines separation device is to recover and recycle any excess coating material and any broken pellets (fines). The fines separation device can be something as simple as a mechanical screen, or it can be an air classifier. The fines are collected and returned either as a pellet-coating material or as a component of newly formed FBC fly ash pellets.

In the disclosed process, several combinations of hydrated FBCR, FBC fly ash and recycle ash are possible feed materials to the high-intensity mixer. These combinations which can be mixed and successfully pelletized include:

1. 0-80% hydrated FBCR/20-100% FBC fly ash;
2. 0-80% recycle ash/20-100% FBC fly ash; or
3. 0-80% recycle ash and/or hydrated bed ash/20-100% FBC fly ash.

Testing has demonstrated the successful pelletization of mixtures with proportions up to 50% of either hydrated FBCR or recycle ash with FBC fly ash and water. Higher amounts of hydrated FBCR and/or recycle ash mixed with the FBC fly ash are possible, probably up to about 80% hydrated FBCR and/or recycle ash.

Three options exist for the application of the coating material to the pellets. All or part of the hydrated FBCR can be applied as a coating at the discharge of the pelletizing pans (actually the pellets can roll through the coating material in the pelletizing pan discharge chute). The remainder of the hydrated FBCR, if any, can be introduced with the FBC fly ash into the high-intensity mixer for discharge to the pelletizer and subsequent pelletizing. A second option involves the introduction of the hydrated FBCR to the high-intensity mixer, while recycle ash is used to coat the pellets. A third option allows for all or some of the hydrated FBCR to be applied as a coating material to the pellets and the excess coating material to be removed from the coated green pellets prior to their entering the curing area. Combinations of the three options also are possible. It should be noted that in the first two options, the fines are removed after curing and serve as a cushion during curing. In addition, the first two options allow for excess material to coat any new surfaces generated by breakage.

There are several advantages resulting from the present invention. The process is capable of pelletizing 100% of the ash from an FBC, without the use of PFA or a separate binder. Both the FBCR and the FBC fly ash effectively are incorporated into pellets. Either the FBC is directly fed to the high-intensity mixer and pelletized or it is used as a coating material and then is incorporated into the pellets as recycle ash.

Another important feature of the present invention is the controlled hydration of the FBCR. The hydration of the FBCR under controlled conditions and the hydration of the lime in the FBCR to a controlled extent permits excellent control of the temperature and moisture conditions in the curing area. Hydration of the FBCR also prevents the generation of excessive heat and steam during curing, thereby minimizing loss of moisture and pellet strength which can occur during curing.

The present invention also prevents agglomeration of the pellets before and during curing. Agglomeration can be prevented by using one or more of the described techniques. However, the use of hydrated FBCR requires no external commodities, other than water. In addition, by forming pellets from a mixture of FBC fly ash alone or in combination with hydrated FBCR and/or recycle ash and then coating the pellets with hydrated FBCR and/or recycle ash, it is possible to produce separate pellets that maintain desirable levels of moisture during curing and that have relatively high crush strengths. Moreover, the hydrated FBCR coating alleviates the swelling and bridging of the coated pellets experienced with non-hydrated FBCR-coated pellets. Any excess FBCR not needed for coating can be incorporated into newly formed pellets without significantly changing the water demand in the high-intensity mixing and pelletization steps.

Another advantage of the present invention is that it provides a product that can be handled safely and used as a construction material. The soluble components of the ash are retained by the pellets and are not leached out into the environment. In addition, the high strength and integrity of the pellets permit the pellets to be used as an aggregate in road construction, masonry units and shapes, backfill material and other building and construction materials and applications. Acceptable levels of lime and other basic components can be leached from the pellets, but this leaching can be used advantageously to remedy acidic conditions in the pellet-disposal area.

Another advantage of the present invention is the separation of the fines from the cured pellets and the use of the fines as a coating material and/or component of newly formed pellets. The separation of fines prevents dust problems in the loading, transportation, unloading and disposal/utilization of the pellets. In addition, the separation of fines prevents large pieces of FBCR from entering the high-intensity mixer with the recycle ash. Screening at about 20 mesh for FBC ash applications can reduce wear in the high-intensity mixer and thereby extend equipment life.

The foregoing and other features and advantages of the present invention will become more apparent when viewed in light of the description of the preferred embodiment of the invention and the drawings that follow, which together form a part of the specification.

BRIEF DESCRIPTION OF THE DRAWINGS

FIG. 9 is a block diagram similar to FIG. 5 in which pellet movement during and subsequent to curing is employed;

FIG. 10 is a block diagram similar to FIG. 6 in which pellet movement during and subsequent to curing is employed;

DESCRIPTION OF THE PREFERRED EMBODIMENT

Figure 1:
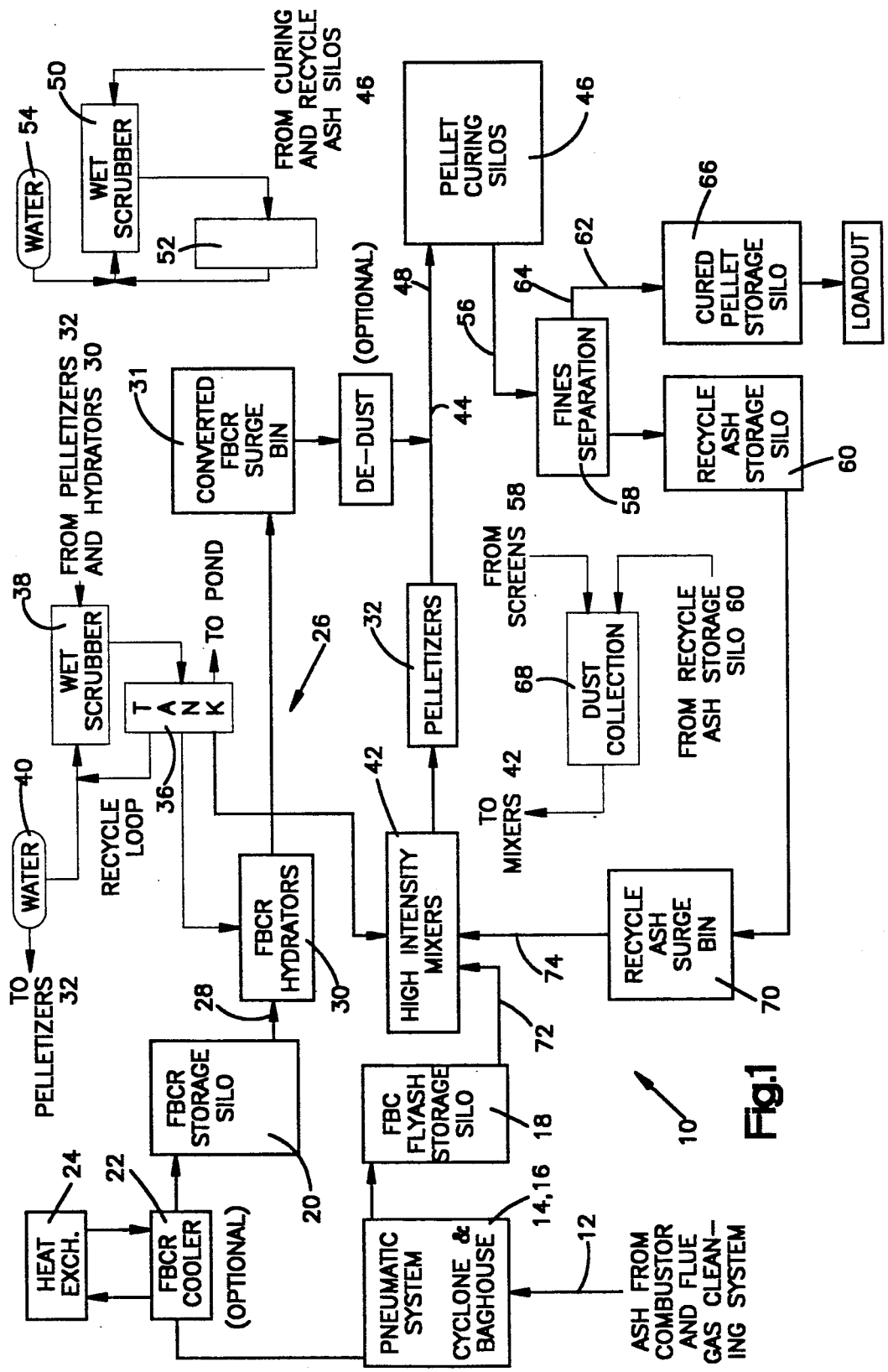
FIG. 1 is a block diagram of the process according to the present invention as it is used to pelletize FBC ash.

The combustion of carbonaceous fuels for the production of electricity and/or process steam by the utility and industrial sectors is a major generator of ash. The invention relates to processes for pelletizing ash from the combustion of carbonaceous fuels such as coal, and for controlling the process and preventing agglomeration and other material-handling flow problems that can occur during pellet curing. The preferred embodiment of the present invention relates to the pelletization of ash from a fluidized bed combustor, although the present invention is applicable to ashes from other types of combustors or incinerators.

As used herein, the term "pellets" refers to generally spherical shapes, usually having a diameter of approximately 1 inch or smaller, dependent upon the end use of the pellets. It is to be understood, however, that the techniques of the present invention can be used to produce a wide variety of shapes of differing sizes. Although the manufacture of pellets is preferred for reasons of economy, the present invention is not limited only to the manufacture of spherical shapes. Accordingly, the term "pellets" is used for convenience only, and such use is to be understood to encompass shapes other than spherical shapes.

Fluidized bed combustion is a relatively new type of combustion system that employs a calcium-based sorbent, such as limestone ($CaCO_3$) or dolomite ($CaMg(CO_3)_2$) to capture in a dry ash state the sulfur dioxide emissions produced from the combustion of carbonaceous fuels such as coal. The ash from an FBC is from two sources: (1) "bed ash" or "spent bed residue" or "fluidized bed combustion residues" (all referred to herein as "FBCR") representing the ash from the combustor, granular in size, and composed principally of the calcined and sulfated sorbent material; and (2) "FBC fly ash" representing the fine-sized and light ash which becomes suspended in the flue gas and which is removed from the flue gas by such devices as cyclones, fabric filters, and/or electrostatic precipitators. FBC fly ash typically is composed of a combination of sorbent-derived and coal-derived ash. FBC fly ash is not a glassy material as is PFA that is derived from conventional pulverized coal combustors. FBC fly ash does not meet the definition of a pozzolanic fly ash according to ASTM C-618 and C-311.

As a result of the use of limestone or dolomite, FBCR contains significant amounts of lime (CaO) and anhydrite ($CaSO_4$). The term "limestone" as used herein refers to naturally occurring limestone or dolomite generally consisting of calcium carbonate or a mixture of calcium carbonate and magnesium carbonate. The phrase "hydrated lime" refers to calcium hydroxide (hydrated high calcium quicklime) or a mixture of calcium hydroxide and magnesium hydroxide. The phrase "converted FBCR" or "hydrated FBCR" refers to FBCR which has been hydrated so that part of the lime in the ash has been hydrated to calcium hydroxide. "Recycle ash" refers to excess coating material and/or cured pellet fines which are removed from coated pellets, usually after curing.

PROCESS DESCRIPTION FOR FBC ASH

Referring to FIG. 1, apparatus for pelletizing FBC ash is indicated generally by the reference number 10. FBCR and FCB fly ash generated during the combustion and flue gas clean-up processes are recovered and are transported pneumatically by means of conveying lines 12 to cyclones 14 and fabric filter devices 16 which separate the ash from the conveying media. The cyclones 14 are capable of collecting essentially all (>95%) of the FBCR. The FBCR not collected by the cyclones 14 is captured by the fabric filter devices (baghouse) 16 and is discharged to FBC fly ash silo 18.

FBCR collected by the cyclones 14 is conveyed directly to FBCR storage silo 20 or, alternatively, if the temperature of the FBCR received from the combustor area is excessively high, the FBCR can be conveyed to a cooler 22 which can cool the ash to a temperature below 212° F. and then deliver it to the FBCR storage silo 20. The FBCR cooler 22 can be one of a number of either direct or indirect ash coolers, such as conventional screw coolers. Heat is removed via a cooling medium and is exhausted to the atmosphere using a heat exchanger 24. The FBCR silo 20 is equipped with low and high level controls as well as an isolation gate and a live bin bottom (not shown), to ensure FBCR flow. FBC fly ash is delivered directly to the FBC fly ash storage silo 18 from the cyclones 14 and the fabric filter devices 16. The FBC fly ash silo 18 is equipped with a fluidized bin bottom (not shown) to ensure proper flow.

The FBCR is conveyed from the FBCR storage silo 20 to a hydrating section 26 comprised of a pneumatic conveying system 28, two hydrators 30, and a surge bin 31. The FBCR entering the hydrators 30 should be kept below 212° F in order to prevent excessive flashing and steam loss during hydration in the hydrators 30. The FBCR is hydrated in the hydrators 30 with controlled water addition in order to achieve approximately 50-95% hydration of the lime in the FBCR. The FBCR is agitated mechanically during the hydration process to assist in the dispersion of the water and to permit steam to be released from the system. The two hydrators 30 can act as batch devices, with one charging and mixing while the other is mixing and discharging. Continuous hydrators 30 can also be used. Batch hydrators, however, provide the capability of varying the water added to the hydrators 30 in order for the production of hydrated FBCR of controlled composition. Hydrated FBCR (or "converted FBCR") from the hydrators 30 is discharged to the surge bin 31. FBCR from the surge bin 31 is controlled by isolation gate devices (not shown) and is fed by variable speed conveyors (not shown) to the discharge area of pelletizers 32.

Water is supplied to the hydrators 30 from a surge tank 36. The surge tank 36 receives the effluent from a wet scrubber 38. The surge tank 36 is needed to facilitate the hydrator batching cycle and demand. The water for the wet scrubber 38 is supplied by a reservoir 40. Alternatively, water from the reservoir 40 can be used as the cooling medium for the FBCR cooler 22 and then as the cleaning medium for the wet scrubber 38, thereby eliminating the need for the heat exchanger 24. The wet scrubber 38 is designed to capture, transport and remove essentially all of the dust and steam from the hydrators 30, the pelletizers 32, and the area where the hydrated FBCR is applied as a pellet-coating material.

Steam and dust from the hydrators 30 are directed to the wet scrubber 38 for recovery and reuse in the hydrators 30 and high-intensity mixers 42 (to be described subsequently). This reduces water consumption and avoids the clean-up and disposal of the scrubber effluent. Hydrated FBCR is transported to the vicinity of pelletizing pan discharge chutes 44 by use of variable speed conveying devices (not shown).

The hydrated FBCR is introduced to the discharge chutes 44 so that the newly formed pellets impact and roll through the hydrated FBCR coating material as the pellets are discharged from the pelletizers 32. Coating of the pellets occurs prior to their introduction into curing silos 46 by way of a conveyor 48. The use of hydrated FBCR in coating the pellets is effective in preventing agglomeration of the newly formed pellets (with attendant flow blockage) at both the entrance to the chutes 44, as well as at the point of discharge from the conveyor 48 into the curing silos 46. Testing has shown that agglomeration of the pellets in the curing silos 46 can be prevented by applying the hydrated FBCR at a rate of at least 10% of the total weight of the pellets, i.e., the coated pellets consist of 90% pellet and 10% hydrated FBCR coating. Higher amounts of FBCR coating provide for additional material to coat any new, uncoated surfaces that may be produced if pellet breakage occurs.

The pellets discharged from the conveyor 48 have been found to the relatively weak and not able to withstand six-foot drops at 90° impacts. Hence, the coated pellets are gently transferred from the conveyor 48 to a reversible transfer conveyor (not shown), which can deliver the coated pellets to one of the curing silos 46. The curing silos 46 are kept as full as possible so as to minimize the drop distance. Alternatively, the pellets can be lowered gently into the silos 46 by employing devices such as bucket-clam shell lowering mechanisms. Cured material is withdrawn from the curing silos 46 at a rate equivalent to the rate of new coated pellet addition, thereby maintaining a full silo for curing. The coated pellets, nested in a bed of hydrated FBCR, are allowed to cure in the curing silos 46 for a predetermined time. Testing has shown that a minimum of 8-10 hours is required to cure pellets to a crush strength of 100 pounds for low-sulfur coal-derived FBC ash pellets and approximately 6 hours for medium-sulfur coal-derived FBC ash pellets. Crush strengths of 100 pounds are capable of withstanding drops of 40 feet with minimal breakage. Drops of 40 feet or greater can be expected in later handling of the pellets.

As in the hydrators 30 and the pelletizers 32, steam and dust is generated in the curing silos 46 as a result of the continued hydration of the pellets. Steam and dust generated in the silos 46 are ducted to a wet scrubber 50 operated in a recycle loop mode with a recycle tank 52, in order to minimize water consumption. A water reservoir 54 supplies the water for the wet scrubber 50. The effluent from the scrubber 50 is supplied to the combustor area coal pile run-off basin. The alkaline nature of the effluent assists in the treatment of the coal pile run-off. The solids are recovered and are either disposed of or are incorporated into the pellets at the high-intensity mixers 42 and the pelletizers 32.

The cured pellets are extracted from the curing silos 46 and are conveyed by a conveyor 56 to a fines separation device 58 such as mechanical screens. Alternatively, the process can forego the hoppers and/or live bin bottoms of the curing silos 46 and use a front end loader to move the pellets and excess coating material to the mechanical screens 58.

The coated pellets are screened at screens 58 to a predetermined size, such as 20 mesh, to separate and recover any excess coating material and pellet fines resulting from pellet breakage during handling, transport and curing. Other types of separation equipment also are possible, such as air classifiers. Testing has shown that 20 mesh is capable of recovering the majority of the excess hydrated FBCR coating material. This material is termed recycle ash. The recycle ash is characterized by particles of coating material and pellets smaller than 20 mesh that are transported pneumatically to a recycle ash storage silo 60. Particles and pellets greater than 20 mesh are transferred to a vertical conveying system 62, such as a bucket elevator, by way of a discharge chute 64, and ultimately are transferred to a storage silo 66.

Airborne dust generated during screening is controlled by ducting the dust and air to a dry particulate collection system 68. The dust that is collected is added to the recycle ash for return to the pelletizers 32. Dust generation in the recycle ash storage silo 60 is controlled by ducting the dust-laden air to the dry dust collection system 68.

Recycled hydrated FBCR ("recycle ash") is transported pneumatically to a surge bin 70 and then is fed along with the FBC fly ash to the high-intensity mixers 42 or is used as a pellet-coating material if sufficient hydrated FBCR is not available for pellet-coating. Testing has shown that pellets can be formed with a mixture of FBC fly ash and up to 50% recycle ash without changing the water demand in the high-intensity mixers 42 or the pelletizers 32. Higher amounts up to 80% recycle ash are probable.

From the FBC fly ash storage silo 18, the FBC fly ash is conveyed to the high-intensity mixers 42 by way of gravimetric feeders 72. Recycle ash and/or excess hydrated FBCR from the surge bin 70 is introduced to the high-intensity mixers 42 by means of gravimetric feeders 74. Water amounting to about 14% of the ash feed weight is added to each high-intensity mixer 42. Moistened and intimately mixed FBC fly ash or FBC fly ash combined with recycle ash and/or hydrated FBCR from the high-intensity mixers 42 is distributed to each pelletizer 32. Additional water amounting to about 7% of the weight of the dry feed to the high-intensity mixers 42 is sprayed onto the pellets being formed. A wider range of water supply to the high-intensity mixers 42 and the pelletizers 32 is possible, dependent upon the composition and physical characteristics of the feed ashes.

It will be appreciated from the foregoing description that the present invention provides a relatively inexpensive arrangement for producing exceedingly durable pellets from 100% of the ashes from FBC. Since only FBC fly ash and recycled FBCR is used to form the pellets, and since such ash is quite finely grained, wear on the high-intensity mixers 42 is reduced substantially compared to introducing non-hydrated and unscreened FBCR directly to the high-intensity mixers 42. Moreover, the FBCR is utilized efficiently, with virtually none of it being wasted or handled separately from the pelletizing process. By hydrating the FBCR prior to its employment in the pelletizing process and by using the hydrated FBCR as a pellet-coating material, pellet agglomeration is prevented and chute pluggage is eliminated at both the pelletizers 32 and the curing silos 46, without sacrificing pellet strength development.

The ash pelletizing arrangement employs scrubbing and dry dust collection systems to prevent fugitive dust emissions. Dust is eliminated from the pelletized product so that smooth operation is maintained, equipment life is prolonged, and loading of the pellets into barges, trucks, or rail cars is facilitated. Since the pellets are extremely strong, they can be used as construction materials. Moreover, the soluble species in the ash are contained in the pellets so that when exposed to the environment, only acceptable levels of lime and other basic components can be leached from the pellets. Indeed, in acidic disposal settings such as coal mines, the pellets actually can improve the environment by neutralizing the acidic conditions.

ALTERNATIVE EMBODIMENTS

The apparatus 10 embodies a preferred technique for pelletizing FBC ash. It is possible that the apparatus 10 can be modified in order to carry out the invention in slightly different ways. Some alternative embodiments of the invention will be discussed hereinafter. For purposes of convenience, components used with the embodiment of FIG. 1 will be referred to hereafter by the same reference numerals where their function and operation remain substantially unchanged from the embodiment of FIG. 1.

Figure 2:
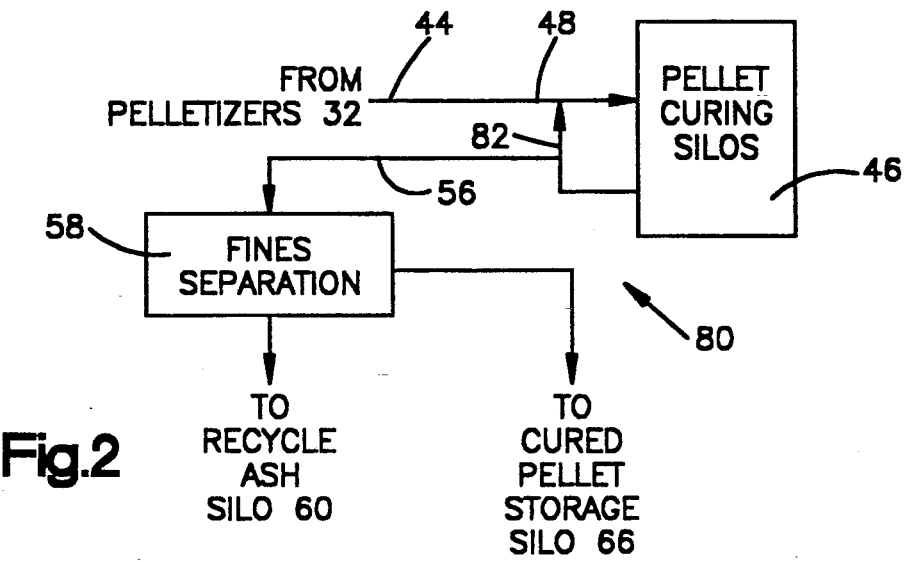
FIG. 2 is a block diagram of a modified portion of FIG. 1, showing an alternate technique for handling cured or partially cured pellets.

Referring to FIG. 2, an alternative arrangement for handling cured, or partially cured, pellets is indicated by the reference numeral 80. The arrangement 80 includes an additional conveyor 82 that branches from the conveyor 56 and which discharges onto the conveyor 48. The conveyor 82 enables cured, or partially cured, pellets to be recycled from the discharge end of the silos 46 to the input end of the silos 46. Accordingly, mechanical agitation of the pellets in the silos 46 can be accommodated merely by moving them continuously through the silos 46 and discharging them either to the fines separation device 58 or to the conveyor 48 for reintroduction into the silos 46. Even if fully cured pellets are recycled by way of the conveyor 82, the introduction of fully cured pellets into the silos 46 does not have a harmful effect upon the curing of fresh pellets, but rather provides further assurance that the fresh pellets will not stick to each other.

Figure 3:
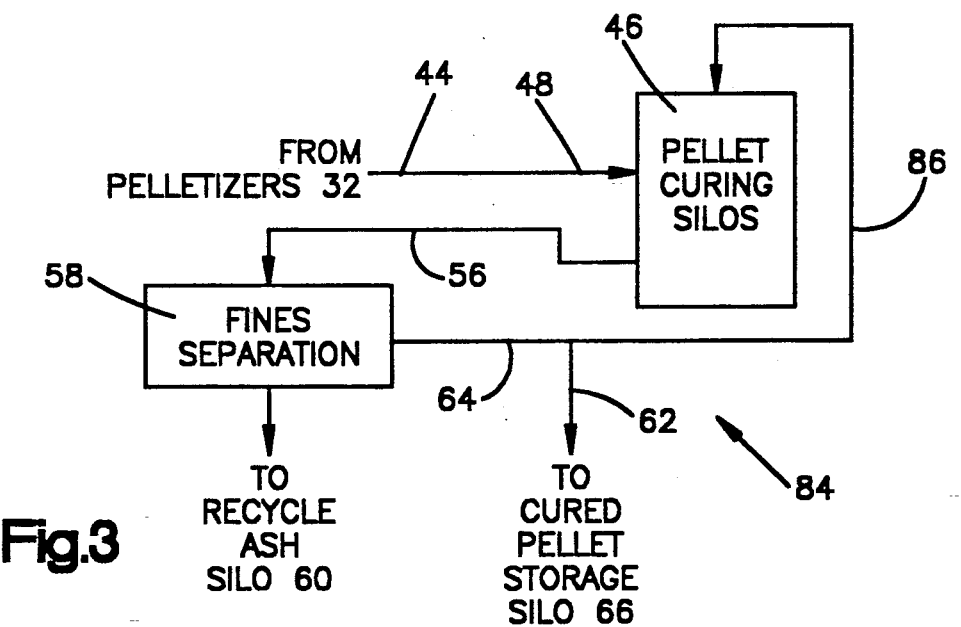
FIG. 3 is a block diagram similar to FIG. 2 showing another technique for handling cured pellets.

Referring to FIG. 3, another pellet handling arrangement is indicated by the reference numeral 84. The arrangement 84 is similar to the arrangement 80, except that the conveyor 82 has been eliminated and replaced by a conveyor 86 that receives fully cured and screened pellets from the chute 64 and directs the screened, cured pellets to the input end of the pellet curing silos 46. As with the arrangement 80, the arrangement 84 provides assurance that fresh pellets moving through the silos 46 will be properly agitated and separated so that sticking cannot occur.

Figure 4:
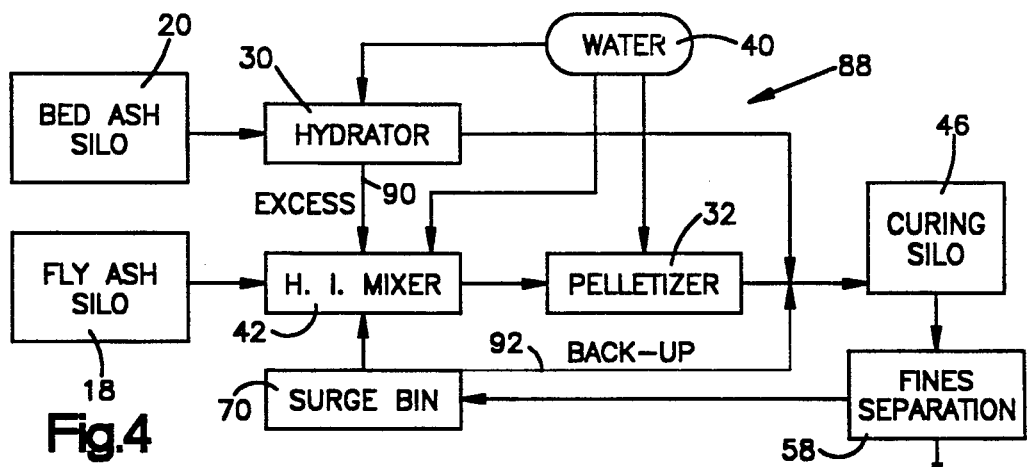
FIG. 4 is a block diagram similar to FIG. 1 in which the majority of hydrated FBCR is introduced as a coating material subsequent to pelletization, with some of the hydrated FBCR being added as a component of pellets being formed.

Referring to FIG. 4, an alternative arrangement for introducing hydrated FBCR into the FBC fly ash being pelletized is indicated by the reference numeral 88. In the arrangement 88, the majority of hydrated FBCR is directed onto the chute 44, as in the embodiment of FIG. 1. A small portion of the hydrated FBCR, however, can be discharged directly into the mixers 42 by way of feed lines 90. Also, while the majority of the recycle ash from the surge bin 70 is directed into the mixers 42 by way of the feeders 74, a small portion ("back-up") of the recycle ash can be directed onto the chute 44 by means of a feeder 92. The use of the feeders 90, 92 permits additional process control in the event the supply of hydrated FBCR or recycle ash may vary, as can happen from time to time.

Figure 5:
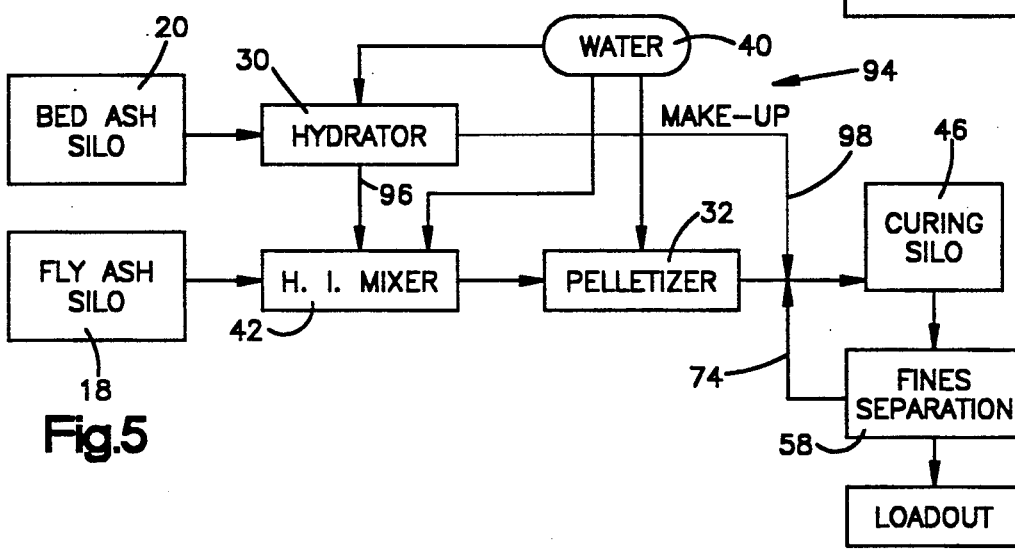
FIG. 5 is a block diagram similar to FIG. 1 in which most of the hydrated FBCR is added as a component of pellets being formed, with some of the hydrated FBCR being used as a coating material subsequent to pelletization.

Referring to FIG. 5, an alternative arrangement for supplying hydrated FBCR and recycle ash to the FBC fly ash being pelletized is indicated by the reference numeral 94. In the arrangement 94, the majority of FBCR is directed into the highintensity mixers 42 by way of feeders 96, while a small portion of the hydrated FBCR ("make-up") is directed onto the discharge chute 44 by way of a feeder 98. Also, recycle ash from the surge bin 70 is directed onto the chute 44 by way of the feeder 74, rather than into the high-intensity mixers 42 as is shown in FIG. 1. Again, as with the embodiment of FIG. 4, the arrangement 94 permits additional process control that accommodates fluctuations in the availability of hydrated FBCR and recycle ash.

Figure 6:
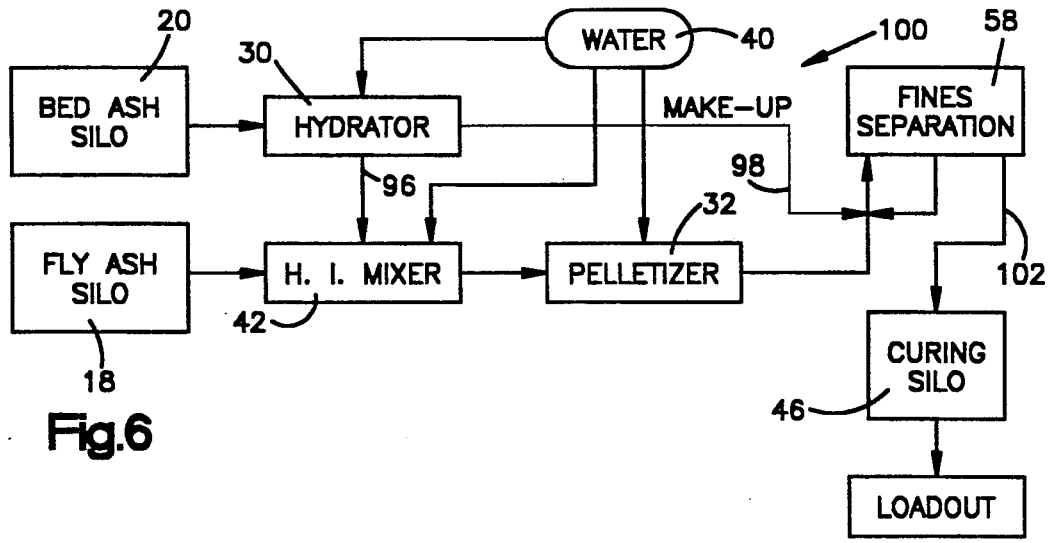
FIG. 6 is a block diagram similar to FIG. 6 in which fines separation occurs subsequent to pelletizing and prior to curing.

Referring to FIG. 6, an alternative arrangement for screening pellets and recycle ash is indicated generally by the reference numeral 100. In the arrangement 100, the majority of hydrated FBCR is discharged into the high-intensity mixers 42 by way of the feeders 96. A small portion of the hydrated FBCR is directed onto the chutes 44 as make-up by way of the feeder 98. However, the fines separation device 58 is disposed intermediate the chute 44 and the input end of the curing silos 46. Large particles (greater than 20 mesh in size) are discharged into the curing silos 46 by way of a conveyor 102. Small particles (smaller than 20 mesh) are directed back onto the chute 44 by means of a conveyor 104 as additional coating material. The arrangement 100 provides that the curing silos will be filled only with coated pellets and substantially no hydrated FBCR as embedding material. While the arrangement 100 is believed to be less desirable than that illustrated in FIG. 1, it represents a desired approach where only cured pellets are sought to be handled in the curing silos 46.

Figure 7:
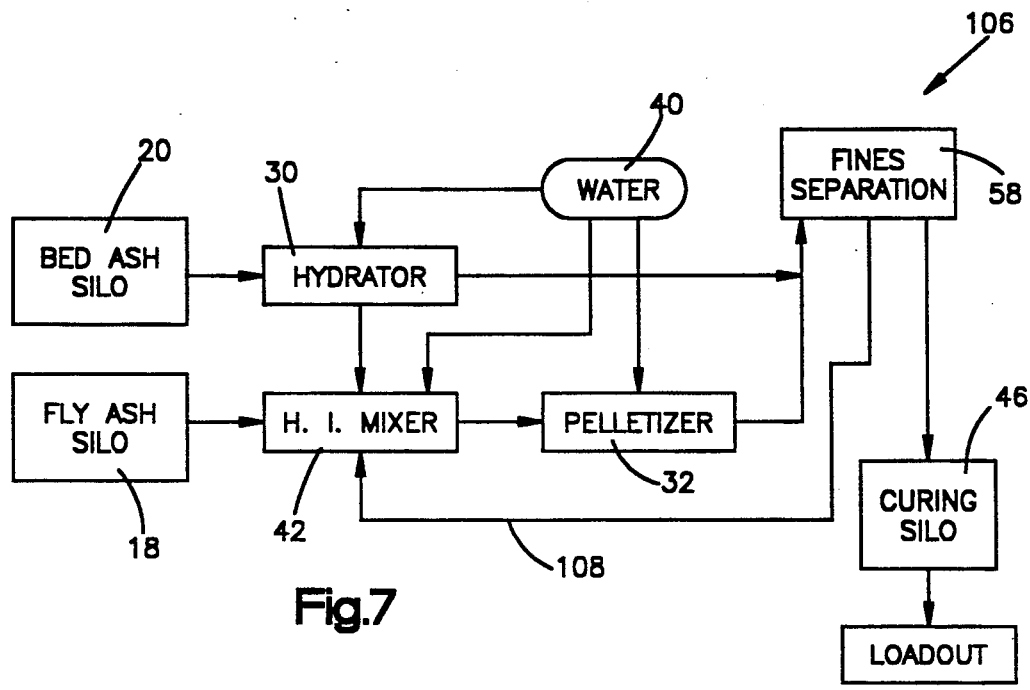
FIG. 7 is a block diagram similar to FIG. 6, in which all of the hydrated FBCR is used as a coating material and fines separation occurs subsequent to pelletizing and prior to curing.

Referring to FIG. 7, an alternative arrangement for handling the hydrated FBCR and the recycle ash is indicated generally by the reference numeral 106. In the arrangement 106, hydrated FBCR is discharged onto the chute 44 as is illustrated in FIG. 1. However, the fines separation device 58 is placed upstream of the curing silos 46 as in the arrangement 100. A conveyor 108 connects the fines separation device 58 with the high-intensity mixers 42. Accordingly, rather than discharge small, screened particles of recycle ash onto the chutes 44, the small, screened recycle ash is directed upstream, into the mixers 42. Again, the arrangement 106 provides additional flexibility in the handling of the hydrated FBCR and the recycle ash to accommodate fluctuations in the supply of hydrated FBCR and recycle ash that may occur from time to time.

Figure 8:
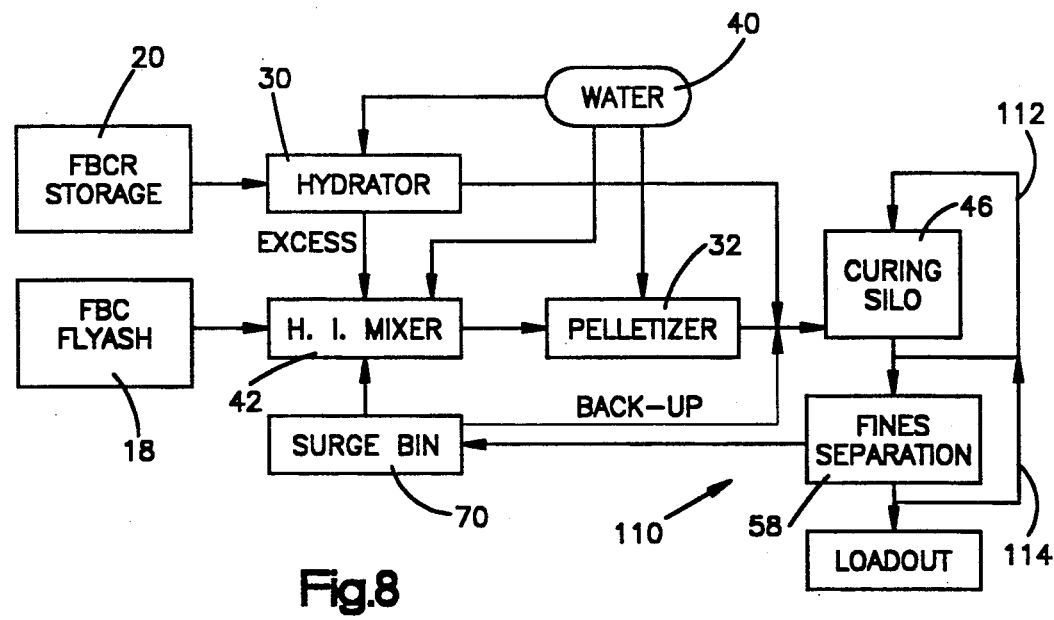
FIG. 8 is a block diagram similar to FIG. 4, in which pellet movement during and subsequent to curing is employed.

Referring to FIG. 8, an alternative arrangement for handling cured pellets is indicated generally by the reference numeral 110. The portions of the apparatus 110 upstream of the curing silos 46 are the same as that disclosed in FIG. 4. However, some of the pellets and excess recycle ash discharged from the curing silos 46 are reintroduced into the curing silos 46 by way of a conveyor 112. Also, some of the screened pellets recovered from the fines separation device 58 are directed onto the conveyor 112 by means of a conveyor 114. The conveyors 112, 114 can be operated independently of each other. In effect, the conveyors 112, 114 enable a portion of the excess recycle ash and/or cured pellets to be reintroduced into the curing silos 46 so as to enhance the mechanical agitation of the partially cured pellets disposed therein. Because it is anticipated that the fresh pellets introduced into the curing silos 46 will be continuously moved through the silos 46, the addition of excess recycle ash and/or a small amount of cured pellets will assist in preventing agglomeration and will provide additional process control over the heat and steam being generated in the silos 46.

Referring to FIG. 9, an alternative arrangement for handling the FBCR and for recycling recycle ash and cured pellets is indicated generally by the reference numeral 116. In the arrangement 116, the FBCR is conveyed from the hydrators 30 to the mixers 42 and the chutes 44 as was done in the embodiment of FIG. 5. The recycle ash and cured pellets are handled as was disclosed in FIG. 8. Accordingly, the arrangement 116 represents a hybrid arrangement for utilizing the FBCR, the recycle ash, and the cured pellets. As with the previously described embodiments, the arrangement 116 provides flexibility in adapting the process to various situations that may exist.

Referring to FIG. 10, an alternative arrangement for handling a portion of the cured pellets is indicated generally by the reference numeral 118. The arrangement 118 is substantially similar to the arrangement 100 disclosed in FIG. 6, except that a conveyor 120 receives a portion of the cured pellets discharged from the curing silos 46. The conveyor 120 reintroduces the cured pellets into the input to the curing silos 46. The feedback loop thus established can be used as additional process control for the screened, but uncured, pellets that are being moved through the curing silos 46.

Figure 11:
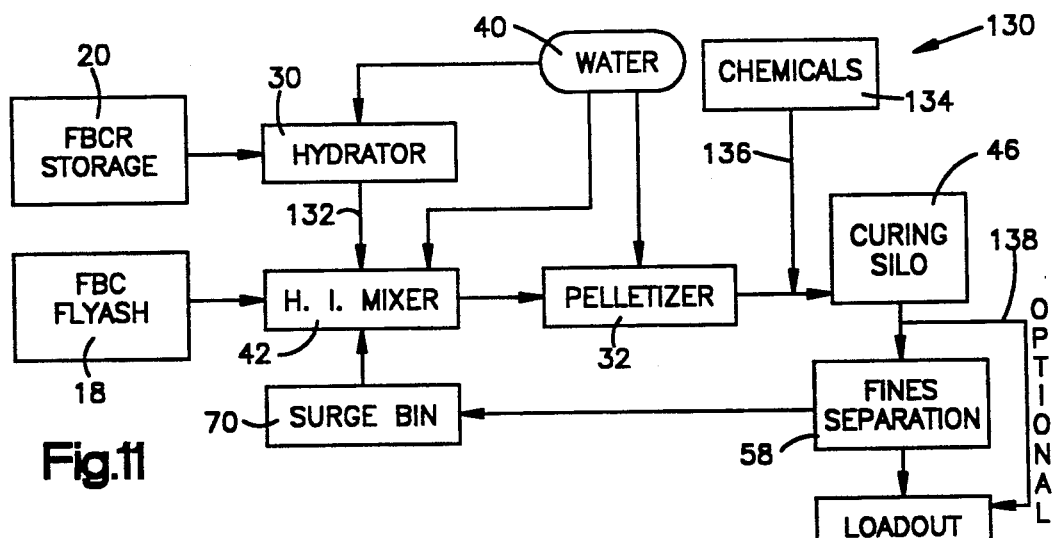
FIG. 11 is a block diagram similar to FIG. 1 in which chemicals are applied subsequent to pelletizing and prior to curing.

Referring to FIG. 11, an arrangement for preventing the agglomeration of pellets by the use of chemicals is indicated generally by the reference numeral 130. In the arrangement 130, all of the hydrated FBCR is directed into the high-intensity mixers 42 by way of feeders 132. A source of liquid chemicals is indicated by the reference numeral 134. The chemicals 134 can be sprayed onto the green pellets exiting the pelletizers 32 either at the discharge chutes 44, the conveyor 48, or both. Spraying is accomplished by the use of conventional sprayers that are indicated by the reference numeral 136. Also, if desired, an unscreened portion of the cured pellets exiting the silos 46 can be conveyed directly to load-out (such as a barge, truck, or railroad car) by means of a conveyor 138. Because all of the hydrated FBCR is discharged into the mixers 42, the hydrated FBCR is incorporated entirely as part of the pellets formed by the pelletizers 32. In this arrangement, the hydrated FBCR is not used as a coating material or as an embedding material for the pellets.

As indicated above, the chemicals 134 can be applied to the pellets in the form of a liquid spray at various locations such as the chutes 44 or the conveyor 48. At these locations, the pellets are separated, thereby allowing the chemicals 134 to be applied to the pellet surfaces. Unfortunately, if the pellets should fracture subsequent to the application of the chemicals 134 but prior to curing, then there will be fresh, untreated pellet surfaces that could lead to agglomeration. Accordingly, an alternative location for applying the chemicals 134 is inside the curing silos 46. In such an arrangement, the entire pile of pellets in the curing silos 46 is sprayed continually with a fine mist as the green pellets are being discharged into the silos 46. As suggested previously, the advantage of this technique is the ability to coat any fresh surfaces which were created from pellet breakage during transport and discharge into the curing silos 46. For the most effective pellet-coating application, the chemicals 134 can be applied to the pellets both before their introduction to the curing silos 46, as well as after their introduction into the curing silos 46.

The chemicals 134 react to complex the calcium in the pellets, or to prevent the formation of calcium sulfoaluminate hydrates and/or calcium silicate hydrates that are believed to be responsible for the binding or hardening of the pellets during curing. There are various chemicals used in the concrete industry as severe set retardants that are effective to stop these reactions. Typically, the chemicals 134 can be variations of carbohydrates and ligno-sulfonates. Tests have demonstrated that products that include gluconates, such as the W. R. Grace product RECOVER, are very effective in preventing pellet agglomeration. The chemicals as supplied commercially typically are in liquid form with approximately 20-30% of active ingredients diluted in water. The chemicals should be diluted from their as-received form with water, typically in a ratio of 2:1 to 5:1, water to chemical. Such a dilution of the as-received chemical has been found to provide adequate pellet agglomeration-preventing action while insuring good distribution of the chemical onto the pellet surfaces.

Figure 12:
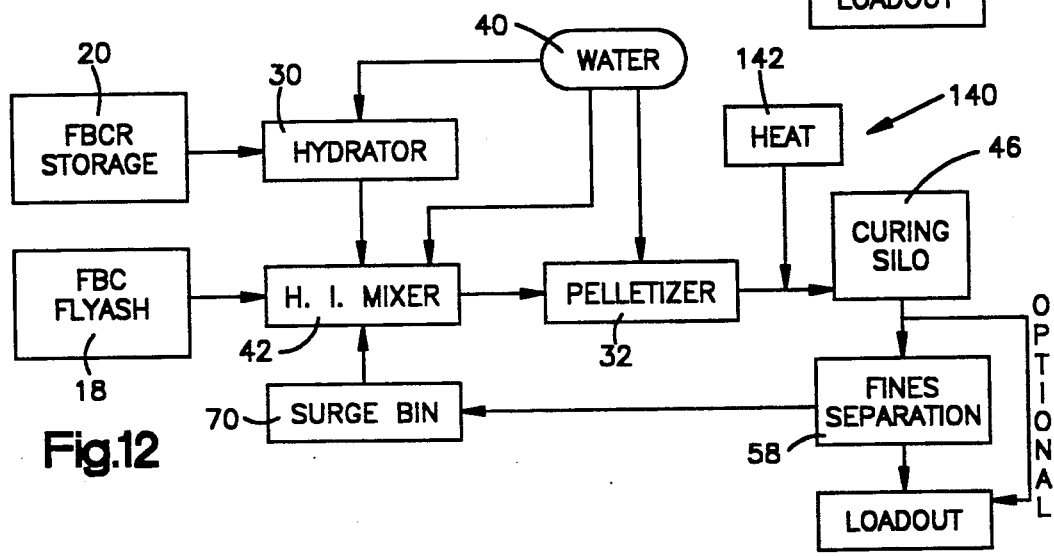
FIG. 12 is a block diagram similar to FIG. 11 in which heat is applied subsequent to pelletizing and prior to curing.

Referring to FIG. 12, an alternative arrangement for preventing pellet agglomeration is indicated generally the reference numeral 140. The arrangement 140 is identical to the arrangement 130, except that heat and/or air drying, rather than chemicals, is applied to the green pellets. Radiant and/or convective heat from a heater 142, such as an infrared heater, is directed onto the pellets being discharged through the chutes 44 and the conveyor 48. The heater 142 causes excess moisture to be removed from the pellet surfaces prior to their final contact with other pellets in the curing silos 46. Because the binding reactions between pellets appear to be the result of hydration reaction products, by removing excess moisture from the pellet surfaces, the hydration reactions at the pellet surfaces cannot proceed.

Agitation of the pellets during application of the heat and/or air drying can be effective in exposing all of the pellet surfaces to the heat and/or air drying. Tests have shown that the pellet surfaces will dry without the application of external heat and/or air drying, provided enough time is available. Extending the time between pellet formation and placement of the pellets into the curing silos 46 by about 20 minutes or longer has been shown to be sufficient to prevent pellet agglomeration. However, if the pellets are broken during transport and discharge into the curing silos 46, then fresh, untreated surfaces will be produced that can lead to agglomeration.

Figure 13:
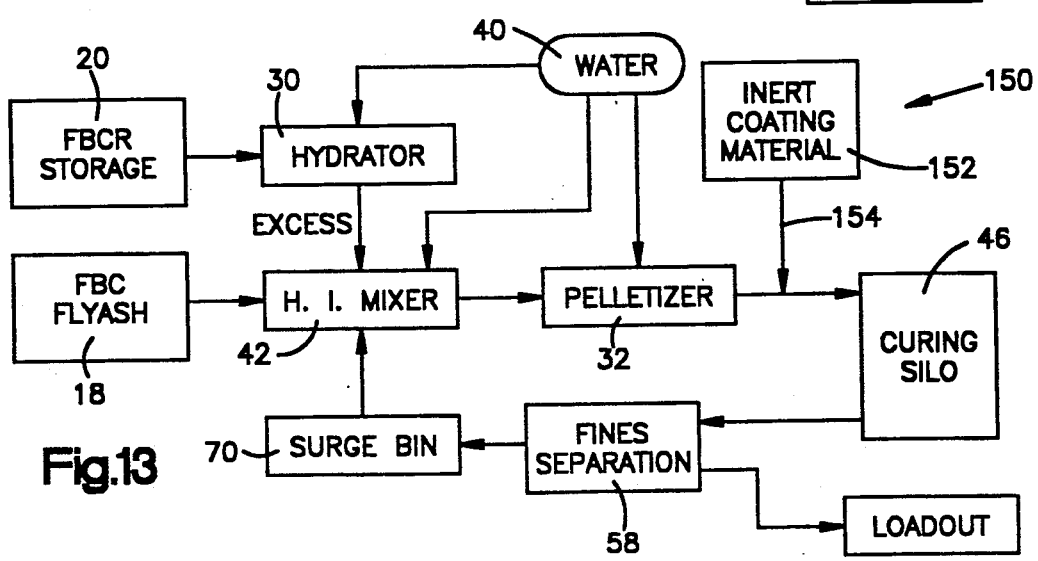
FIG. 13 is a block diagram similar to FIG. 12 in which an inert coating material is applied subsequent to pelletizing and prior to curing.

Referring to FIG. 13, an alternative arrangement for preventing the agglomeration of pellets is indicated generally by the reference numeral 150. The arrangement 150 is substantially identical to the arrangements 130, 140, except that an inert coating material, rather than chemicals or heat/air drying is applied to the green pellets. Conceptually, the arrangement 150 is similar to that disclosed in FIGS. 1-10 in that the hydrated FBCR or recycle ash constitute inert coating materials. Nevertheless, the use of inert coating material from an external source is contemplated.

The inert coating material is indicated by the reference numeral 152, which material can be discharged onto the chutes 44 and/or the conveyor 48 by means of feeders 154. The inert coating material 152 should be a non-reactive granular or powdery material that coats the pellets so as to prevent the reactive pellet surfaces from contacting each other during curing. The inert coating material 152 also has a tendency to remove moisture from the pellet surfaces, thereby stopping the hydration reactions as described with reference to FIG. 12. It is believed that a wide range of inert coating materials 152 can be used, including sand or pulverized limestone. A minimum of about 10% by weight of coating material is sufficient to coat the pellet surfaces effectively and prevent agglomeration. The minimum amount of coating material required will vary as a function of the size of the pellets (amount of surface area to coat) and the particle size of the coating material. Coating levels as high as 50% have been used successfully. Relatively high coating levels, for example 25-35%, tend to cushion the pellets during transport and during charging into the curing silos 46, thereby reducing pellet breakage. High coating levels also enable any new pellet surfaces that may be generated due to fracture to be coated as a result of the availability of excess coating material. Although the arrangement 150 has been found to be effective in reducing pellet agglomeration, the arrangements disclosed in FIGS. 1-10 are preferred for reasons of economy in that the earlier-described arrangements are self-contained, that is, no external source of inert coating material is required.

Although the invention has been described in its preferred form with a certain degree of particularity, it will be understood that the present disclosure of the embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method for pelletizing ash from a combustor in which carbonaceous fuel is burned in the presence of calcium, wherein bed ash is produced in the combustor and wherein fly ash is generated as a by-product of the combustion process, comprising the steps of:

obtaining fly ash generated during the combustion process;

adding water to the fly ash to form a mixture;

forming pellets form the fly ash-water mixture;

providing an inert coating material other than fly ash that is non-reactive with the surfaces of the pellets, said material, when applied to the surfaces of the pellets, affecting the surfaces of the pellets such that the pellets will not adhere to each other;

applying the coating material to the surfaces of the pellets to form coated pellets; and curing the coated fly ash pellets.

2. The method of claim 1, wherein the inert material is selected from the group consisting of non-calcium containing bed ash and sand.

3. The method of claim 1, wherein the step of curing is accomplished by nesting the coated pellets in a bed of the inert material.

4. The method of claim 1, wherein the inert material constitutes about 10% or greater by weight of the coated pellets.

5. The method of claim 3, further comprising the steps of:

separating the cured, coated pellets from the bed of inert material; and mixing the separated inert material with fly ash and water prior to forming additional pellets.

6. The method of claim 5, wherein the step of separating the cured, coated pellets from the bed of inert material includes separating particles greater than about 20 mesh size from the bed of inert material.

7. The method of claim 5, wherein the inert material containing coated pellets contain about 0-80% by weight of inert material and about 100-20% by weight of fly ash.

8. The method of claim 1, further comprising the steps of:

separating the coated pellets form excess inert material prior to the step of curing the pellets; and mixing the separated excess inert material with fly ash and water prior to forming additional pellets.

9. The method of claim 8, wherein the step of separating the coated pellets from excess inert material includes separating particles greater than about 20 mesh size from the inert material.

10. The method of claim 8, wherein inert material-containing coated pellets contain about 0-80% by weight of inert material and about 100-20% by weight of fly ash.

11. The method of claim 3, further comprising the steps of:

separating the cured, coated pellets form the bed of inert material; and coating newly formed pellets with the separated inert material.

12. The method of claim 11, wherein a portion of the separated inert material is mixed with fly ash and water prior to the step of forming pellets.

13. The method of claim 11, wherein the step of separating the cured, coated pellets from the bed of inert material includes separating particles greater than about 20 mesh size from the bed of inert material.

14. The method of claim 1, further comprising the steps of:

separating the coated pellets form excess inert material prior to the step of curing the pellets; and coating newly formed fly ash pellets with the separated inert material prior to the step of curing the newly formed fly ash pellets.

15. The method of claim 14, wherein a portion of the separated inert material is mixed with fly ash and water prior to forming additional pellets.

16. The method of claim 14, wherein the step of separating the coated pellets from the inert material includes separating particles greater than about 20 mesh size from the inert material.

17. The method of claim 1, wherein the step of forming pellets includes the steps of providing a rotating, open dish and depositing the fly ash-water mixture into the dish.

18. The method of claim 1, wherein the coated fly ash pellets are cured for at least about 6-10 hours.

19. The method of claim 1, further comprising the step of moving the pellets relative to each other during curing.

20. The method of claim 3 further comprising the steps of:

separating the cured, coated pellets from the bed of inert material; and mixing some of the cured, coated pellets with the coated pellets prior to the step of curing.

21. The method of claim 3, further comprising the step of mixing some of the cured, coated pellets and some of the inert material from the bed with coated pellets prior to the step of curing.

22. The method of claim 1, wherein the combustor is a fluidized bed combustor in which limestone particles are suspended in the presence of carbonaceous fuel being burned, wherein the bed ash comprises lime-containing fluidized bed combustion residue (FBCR) produced in the combustor, and wherein the fly ash comprises fluidized bed combustion (FBC) fly ash generated as a by-product of the combustion process; and further comprising the step of adding water to the FBCR so as to convert about 50-95% of the lime to hydrated lime and thereby form hydrated FBCR, said hydrated FBCR constituting the coating material.

23. The method of claim 22, wherein the step of curing is accomplished by nesting the coated pellets in a bed of hydrated FBCR.

24. The method of claim 22, wherein the hydrated FBCR coating constitutes about 10% or greater by weight of the coated pellets.

25. The method of claim 23, further comprising the steps of:

separating the cured, coated pellets from the bed of hydrated FBCR; and mixing separated hydrated FBCR with fly ash and water prior to the step of forming pellets.

26. The method of claim 25, wherein the step of separating the cured, coated pellets from the bed of hydrated FBCR includes separating particles greater than about 20 mesh size from the bed of hydrated FBCR.

27. The method of claim 26, wherein the cured, coated pellets contain about 0-80% by weight of hydrated FBCR and about 100-20% by weight of fly ash.

28. The method of claim 22, further comprising the steps of:

separating the coated pellets from excess hydrated FBCR coating material prior to the step of curing the pellets; and mixing the separated hydrated FBCR coating material with fly ash and water prior to the step of forming pellets.

29. The method of claim 28, wherein the step of separating the coated pellets from excess hydrated FBCR coating material includes separating particles greater than about 20 mesh size from the hydrated FBCR coating material.

30. The method of claim 29, wherein the cured, coated pellets contain about 0–80% by weight of hydrated FBCR and about 100–20% by weight of FBC fly ash.

31. The method of claim 23, further comprising the steps of:
   separating the cured, coated pellets from the bed of hydrated FBCR; and
   coating the fly ash pellets with some of the separated, hydrated FBCR.

32. The method of claim 31, wherein the step of separating the cured, coated pellets from the bed of hydrated FBCR includes separating particles greater than about 20 mesh size from the bed of hydrated FBCR.

33. The method of claim 22, further comprising the steps of:
   separating the coated pellets from excess hydrated FBCR coating material prior to the step of curing the pellets; and
   coating newly formed pellets with some of the excess separated, hydrated FBCR.

34. The method of claim 33, wherein the step of separating the pellets form excess hydrated FBCR includes separating particles greater than about 20 mesh size from the hydrated FBCR.

35. The method of claim 1, wherein the combustor is a fluidized bed combustor in which limestone particles are suspended in the presence of carbonaceous fuel being burned, wherein the bed ash comprises lime-containing fluidized bed combustion residue (FBCR) produced in the combustor, and wherein the fly ash comprises fluidized bed combustion (FBC) fly ash generated as a by-product of the combustion process; further comprising the steps of:
   adding water to the FBCR so as to convert about 50–95% of the lime to hydrated lime and thereby form hydrated FBCR; and
   mixing hydrated FBCR with the fly ash-water mixture prior to the step of forming pellets.

36. The method of claim 35, wherein the coating material comprises a chemical in liquid form.

37. The method of claim 36, wherein the chemical is selected from the group consisting of carbohydrates and lignosulfonates.

38. The method of claim 37, wherein the step of applying is accomplished by spraying.

39. The method of claim 35, wherein the coating material comprises an inert material not including calcium containing bed ash.

40. The method of claim 39, wherein the inert material is selected from the group consisting of non-calcium containing bed ash and sand.

41. The method of claim 22 wherein the amount of water added to the FBCR is equal to about 8–16% by weight of the FBCR.

42. A method for pelletizing ash from a combustor in which carbonaceous fuel is burned in the presence of calcium, and wherein fly ash is generated as a by-product of the combustion process, comprising the steps of:
   obtaining fly ash generated during the combustion process;
   adding water to the fly ash to form a mixture;
   forming pellets from the fly ash-water mixture;
   drying the surfaces of the pellets; and
   curing the pellets.

43. The method of claim 42, wherein the surfaces of the pellets are dried for about 20 minutes before curing.

44. The method of claim 42, wherein the combustor is a fluidized bed combustor in which limestone particles are suspended in the presence of carbonaceous fuel being burned, wherein the bed ash comprises lime-containing fluidized bed combustion residue (FBCR) produced in the combustor, and wherein the fly ash comprises fluidized bed combustion (FBC) fly ash generated as a by-product of the combustion process; and further comprising the steps of:
   adding water to the FBCR so as to convert about 50–95% of the lime to hydrated lime and thereby form hydrated FBCR; and
   mixing hydrated FBCR with the fly ash-water mixture prior to the step of forming pellets.

45. A method for pelletizing ash from a fluidized bed combustor in which limestone particles are suspended in the presence of carbonaceous fuel being burned, wherein lime-containing fluidized bed combustion residue (FBCR) is produced in the combustor, and wherein fluidized bed combustion (FBC) fly ash is generated as a by-product of the combustion process, comprising the steps of:
   obtaining FBCR from the combustor;
   obtaining FBC fly ash generated during the combustion process;
   adding water to the lime-containing FBCR so as to convert about 50–95% of the lime to hydrated lime and thereby form hydrated FBCR;
   adding water to the FBC fly ash to form a mixture;
   forming pellets from the FBC fly ash-water mixture;
   applying the hydrated FBCR to the surfaces of the pellets to form coated pellets;
   curing the coated pellets by nesting them in a bed of hydrated FBCR;
   separating the cured, coated pellets form the bed of hydrated FBCR; and
   mixing the separated, hydrated FBCR with FBC fly ash and water prior to forming additional pellets.

46. The method of claim 45, wherein a portion of the separated, hydrated FBCR is applied to the surfaces of the additional pellets prior to curing the additional pellets.

47. The method of claim 45, wherein a portion of the hydrated FBCR is added to the FBC fly ash-water mixture prior to the step of forming pellets form the FBC fly ash-water mixture.

48. The method of claim 45, wherein the step of forming pellets includes the steps of providing a rotating, open dish and depositing the fly ash-water mixture into the dish.

49. The method of claim 45, wherein the coated pellets are cured for at least about 6–10 hours.

50. The method of claim 45, further comprising the step of moving the pellets relative to each other during curing.

51. The method of claim 45, wherein the amount of water added to the FBCR is equal to about 8–16% by weight of the FBCR.

52. A pellet formed from ash from a combustor in which carbonaceous fuel is burned in the presence of calcium, wherein bed ash is produced in the combustor, and wherein fly ash is generated as a by-product of the combustion process, comprising:

a body formed from fly ash and water; and a coating material applied to the surface of the body, the coating material affecting the surface of the body such that the pellet will not adhere to like pellets.

53. The pellet of claim 52, wherein the coating material is selected from the group consisting of carbohydrates, lignosulfonates, non-calcium containing bed ash, sand and limestone.

54. The pellet of claim 52, wherein the body includes, in addition to fly ash and water, an additive selected from the group consisting of non-calcium containing bed ash, sand and limestone.

55. The pellet of claim 54, wherein the coating material and the additive constitute about 0–80% by weight of the pellet and the fly ash constitutes about 100–20% by weight of the pellet.

56. A pellet formed from ash from a fluidized bed combustor in which limestone particles are suspended in the presence of carbonaceous fuel being burned, wherein lime-containing fluidized bed combustion residue (FBCR) is produced in the combustor, and wherein fluidized bed combustion fly ash is generated as a by-product of the combustion process, comprising:

a body formed from FBC fly ash and water; and a coating of hydrated FBCR applied to the surface of the body.

57. The pellet of claim 56, wherein the hydrated FBCR constitutes about 10% by weight of the coated pellet.

58. The pellet of claim 56, further comprising hydrated FBCR mixed with the body of FBC fly ash and water.

59. The pellet of claim 58, wherein the hydrated FBCR constitutes about 0–80% by weight of the pellet and the FBC fly ash constitutes about 100–20% by weight of the pellet.

* * * * *